United States Patent [19]

Varma

[11] Patent Number: 4,687,598

[45] Date of Patent: Aug. 18, 1987

[54] ELECTRODE-ACTIVE MATERIAL FOR ELECTROCHEMICAL BATTERIES AND METHOD OF PREPARATION

[75] Inventor: Ravi Varma, Hinsdale, Ill.

[73] Assignee: The United States of America as represented by the United States Department of Energy, Washington, D.C.

[21] Appl. No.: 876,649

[22] Filed: Jun. 17, 1986

Related U.S. Application Data

[63] Continuation of Ser. No. 549,382, Nov. 7, 1983, abandoned.

[51] Int. Cl.$^4$ .............................................. H01B 1/06
[52] U.S. Cl. .................................... 252/518; 252/512; 252/519; 252/500; 252/511; 252/182.1; 429/209; 429/212; 429/213; 429/218; 429/225; 429/223; 429/228
[58] Field of Search ............... 252/500, 512, 518, 519, 252/503, 506, 502, 511, 182.1; 429/212, 209, 213, 218, 220-228

[56] References Cited

U.S. PATENT DOCUMENTS

| | | | |
|---|---|---|---|
| 931,081 | 8/1909 | Perry | 252/182.1 |
| 1,083,356 | 1/1914 | Edison | 252/182.1 |
| 2,658,099 | 11/1953 | Basset | 429/218 |
| 3,088,991 | 5/1963 | Ruben | 429/198 |
| 3,657,013 | 4/1972 | Melin | 252/182.1 |
| 3,752,706 | 8/1973 | Melin | 252/182.1 |
| 4,049,027 | 9/1977 | Seiger | 29/623.6 |
| 4,182,797 | 1/1980 | Kondo et al. | 429/191 |
| 4,202,789 | 5/1980 | Saridakis | 252/182.1 |
| 4,233,377 | 11/1980 | Haering et al. | 429/218 |
| 4,488,943 | 12/1984 | Skotheim | 429/111 |

Primary Examiner—Josephine L. Barr
Attorney, Agent, or Firm—Hugh W. Glenn; Robert J. Fisher; Judson R. Hightower

[57] ABSTRACT

A battery electrode material comprising a non-stoichiometric electrode-active material which forms a redox pair with the battery electrolyte, an electrically conductive polymer present in the range of from about 2% by weight to about 5% by weight of the electrode-active material, and a binder. The conductive polymer provides improved proton or ion conductivity and is a ligand resulting in metal ion or negative ion vacancies of less than about 0.1 atom percent. Specific electrodes of nickel and lead are disclosed.

11 Claims, No Drawings

ELECTRODE-ACTIVE MATERIAL FOR ELECTROCHEMICAL BATTERIES AND METHOD OF PREPARATION

The United States Government has rights in this invention pursuant to Contract No. W-31-109-ENG-38 between the U.S. Department of Energy and Argonne National Laboratory.

This is a continuation of application Ser. No. 549,382 filed Nov. 7, 1983 now abandoned.

BACKGROUND OF THE INVENTION

This invention relates to electrode-active material for both primary and secondary batteries and to the preparation thereof. It has been determined that solid state crystal defects and imperfections are needed to meet the material requirements of electrochemically-active battery plate material either in primary batteries or in secondary batteries. The electrode-active material of the invention is applicable for ambient temperature, sub-zero temperature or high temperature operational batteries and is also applicable to cathode or anode plates made of the electrode-active material in contact with aqueous electrolytes, non-aqueous electrolytes, molten salts or solid state electrolytes.

Although the design requirements for primary and secondary batteries are different, the electrode-active material of the present invention is applicable for either. The electrode-active materials of the present invention are thermodynamically reversible, having large capacities providing high utilization, have a high rate discharge capability, and exhibit durability during continued charge and discharge cycles. In choosing the electrode-active material, for a cathode the material should be an n-type conductor during the charge mode and a p-type conductor during the discharge mode while for an anode the electrode-active material should be a p-type conductor during the charge mode and an n-type conductor during the discharge mode.

The electrode-active material of the present invention envisions provision of crystal imperfections such as dislocations, point defects and others, thereby providing metal or negative ion vacancies in the electrode-active material to provide the enhanced characteristics required.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

This invention relates to an electrode-active material for either cathodes or anodes in both primary and secondary batteries which comprises non-stoichiometric material which forms a redox pair with the battery electrolyte wherein the ion-conducting and non-stoichiometric characteristic of the material is provided by an electrically conductive polymer which acts as a ligand, thereby to provide the required metal ion or negative ion vacancies in the electrode-active material.

DETAILED DESCRIPTION OF THE INVENTION

In the preparation of the electrode-active material of the present invention, positive plates or cathodes may be made out of compounds of nickel, iron, lead, cobalt, copper and their alloys. Preferably the electrode-active material for a cathode is a chalcogen-containing compound such as the oxide, the hydroxide, the oxyhydroxide, sulfide, sulfate and corresponding tellerium compounds. Negative plates or anodes may be made out of compounds of the alkali metals and specifically lithium, sodium, potassium, the alkali earth compounds such as calcium and magnesium and other well known anode compounds such as manganese, zinc, cadmium, copper, silicon, aluminum, lead and the alloys thereof. In the process of the invention, the electrode-active material is prepared by providing solid stoichiometric material. For instance in a nickel hydroxide-cobalt hydroxide system, the nickel and cobalt hydroxides may be prepared from the corresponding nitrates treated with ammonium hydroxide to precipitate the hydroxides. Thereafter the plate material is mixed with an electrically conductive polymer which acts as a ligand to provide the metal ion vacancy. A ligand suitable for positive plates is a cyclic polyamine with three to six functional groups in the ring.

Ligands which are useful for anode-active material are cyclic polyethers, hydrogen uranyl phosphate, polymers of alkali metal salts and polyethylene oxide, TTF-TCNQ (tetrathiafulvalene-7,7,8,8-tetracyanoquinodimethane), cyclic polyamines and ruthenium organic polymers. For instance, tertiary butyl cyclohexyl-15-crown-5 is a cyclic polyether which is acceptable for the present invention. Polymers prepared from lithium salts such as $LiCF_3SO_3$ and polyethylene oxide as well as polymers prepared from lithium bromide and polyethylene oxide or sodium sulfide or cyanide and polyethylene oxide are also suitable for anode-active material.

When mixing the electrode-active material and the polymer, the polymer should be present in the range of from about 2 to about 5 percent by weight of the electrode-active material. If the electrically conductive polymer is present in an amound less than about 2 percent by weight the performance of the electrode-active material suffers and the discharge rate slows down. On the other hand, if the electrically active polymer is present in an amount greater than about 5 percent by weight, the utilization of the electrode-active material is lower because it is diluted with the polymer.

To the mixture of the electrode-active material and the polymer is added a binder such as polyvinyl chloride or tetrafluoroethylene monomer in an amount of about 1 percent by weight. This material is mixed in an aqueous solution, although non-aqueous solvents are also acceptable, to form a paste and thereafter pressed or formed into the appropriate cathode or anode plate.

Turning now to the nickel-cobalt cathode plate, it has been found that if cobalt is present in an amount in the narrow range of greater than 3 mole percent to about 5 mole percent an improved cathode plate is provided, although most improved results have been shown for cobalt in about 5 mole percent concentration. Although it has been recognized for years that the addition of cobalt to nickel improves the performance of a cathode made therefrom, it has now been found that a very narrow critical range provides unexpectedly improved results. For instance, a cathode made in accordance with the method of the present invention having five mole percent cobalt hydroxide in nickel hydroxide was cycled in a battery for 13 cycles before the plate utilization fell below 60 percent. When the cobalt was present in the amount of 2.5 mole percent, the battery was cycled only six times before the plate utilization fell below 60 percent. Similarly, when the cobalt was present in the amount of 3 mole percent the cell was able to be cycled ten times and when cobalt was present in the amount of 10 mole percent the cell could only be cycled three times. Accordingly, it is seen that if cobalt is present in the narrow range of more than 3 mole percent to about 5 mole percent and more specifically about 5 mole percent, a vastly improved cathode results providing significantly improved cell life.

It has also been determined in working with nickel-cobalt cathodes that when placed opposite an iron electrode, the nickel becomes inactivated. Upon investigation, it was determined that the alpha form of nickel is critical to good cell performance and iron, particularly ferric ion, is harmful for optimum electrochemical performance of nickel hydroxide electrodes. In order to recover the lost capacity and reduced cycleability for nickel cathodes in a battery with an iron anode, dopant quantities of thallium ion were added in the nickel hydroxide cathode and this neutralized most of the harmful effects of the ferric ion.

Dopant quantities as used in this application mean quantities of an impurity in the range of from about $10^{-3}$ to $10^{-5}$ weight percent of the electrode-active material.

In working with lead oxide cathodes, the electrically conductive polymers used were polyacetylene polymers having a high molecular weight of over 10,000. These ligands or electrically conductive polymers provided improved cathode plates. It was also found that the addition of bismuth or antimony in dopant quantities, that is the bismuth or the antimony was present in the cathode in an amount in the range of between $10^{-3}$ to $10^{-5}$ percent by weight of the lead dioxide was helpful and provided an improved cathode performance. By improved cathode performance, it is meant herein that the plate characteristics improved 10 to 20 percent compared to plates without the dopant. For instance a cathode plate formed of lead sulfate and antimony sulfate provided electrode utilization in the area of 75 to 80 percent whereas normal utilization without the dopant would be in the area of 60 to 65 percent. Similar results were found with combinations of lead sulfate and bismuth sulfate.

In all cases, the metal ion vacancies or the negative ion vacancies provided by mixing the electrode-active material and the electrically conductive polymer which acts as a ligand must be in the range of between 0.05 and 0.1 atom percent. Metal ion or negative ion vacancies greater or less than the specified range did not provide the improved characteristics of the cathodes and anodes of the present invention. Some electrically conductive polymers specified herein are not as electrically conductive as others, and it may be desirable to incorporate electrically conductive carbon as an additive. Electrically conductive carbon is well known in the art.

In a specific example of the present invention one molar lead nitrate solution in hot water was mixed with $10^{-3}$ molar antimony nitrate in hot water and mixed to provide a homogenous hot solution. To the homogenous mixed solution, a concentrated sulfuric acid solution was added to precipitate lead sulfate doped with antimony sulfate. This material was dried over an oil bath to provide substantially dry solid material. To this material was added 3 weight percent polyacetylene polymer having a molecular weight in excess of 10,000 and a polyvinyl chloride binder present in the amount of 1 weight percent. Polyvinyl chloride was an aqueous solution and the entire mixture was well mixed and heated to provide a paste like consistency. The paste was pressed into a matrix, as is well known in the art, to form the cathode plate of the invention.

Summarizing, there has been provided new and improved electrode-active material for cathode plates and anode plate for primary and secondary batteries and a method of making same. Electrically conductive polymers mixed with the electrode-active material not only improve proton or ion conductivity but also function as ligands to create metal ion or negative ion vacancies. Electrode-active material prepared by the method of this invention have shown 10% to 20% increased values compared to state of the art electrodes.

There has also been disclosed an unexpected improvement in battery life when almost 5 mole percent cobalt is included in a nickel cathode. The range of from greater than 3 mole percent to about 5 mole percent cobalt in nickel seems to provide improved results as compared to other nickel-cobalt combinations.

There has also been disclosed an improved lead oxide cathode having dopant concentrations of either antimony or bismuth. The invention is broad enough to encompass any electrode-active material which forms a redox pair with the battery electrolyte.

While there has been described what at present is considered to be the preferred embodiments of the invention, it will be readily appreciated by those skilled in the art that various modification and alterations may be made therein without departing from the true spirit and scope of the present invention and claims.

The embodiments of the invention in which an exclusive property or privilege is claimed are defined as follows:

1. A negative electrode material for an electrochemical battery comprising an electrode-active material selected from the group consisting of lithium, sodium, potassium calcium, magnesium, manganese, zinc, cadmium, copper, silicon, aluminum, lead and alloys thereof, said electrode-active material forms a redox pair with the battery electrolyte, a ligand selected from the group of electrically conductive polymers consisting of tertiary butyl cyclohexyl-15-crown-5, TTF-TCNO and polymers of polyethylene oxide and one or more of $LiCF_3SO_3$, LiBr, $Na_2S$, and NaCN present in the range of from about 2% by weight to about 5% by weight of said electrode-active material to provide negative ion vacancies in the range of from about 0.05 to about 0.1 atom percent in the lattice structure of said electrode-active material and a binder material.

2. The electrode material of claim 1, wherein said electrode-active material is a lead compound having an antimony compound present in a concentration of from about $10^{-5}$ to about $10^{-3}$ weight percent of the electrode material.

3. The electrode material of claim 1, wherein said electrode-active material is a lead compound having a bismuth compound present in a concentration of from about $10^{-5}$ to about $10^{-3}$ weight percent of the electrode material.

4. A positive electrode material comprising an electrode-active material selected from the class consisting of chalcogen-containing compounds of Ni, Fe, Pb, Co, Cu, and mixtures thereof, a ligand in the form of the electrically conductive polymer present in the range of from about 2% by weight to about 5% by weight of said positive electrode material, wherein said electrodeactive material and said ligand combine to provide metal ion vacancies in the electrode-active material lattice structure in the range of from about 0.05 to about 0.1 atom percent, and a binder, wherein said ligand is selected from the class consisting of polyacetylene polymers having molecular weights in excess of 10,000 and a cyclic polyamine with 3–6 functional groups.

5. The electrode material of claim 4, wherein said electrode-active material is a nickel compound having a cobalt compound present in the range of from greater than about 3 mole percent to about 5 mole percent.

6. The electrode material of claim 4, wherein the nickel and cobalt compounds are hydroxides, the cobalt is about 5 mole percent and thallium dopant is present in a concentration of from about $10^{-3}$ weight percent of the electrode material.

7. The electrode material of claim 4, wherein the electrode-active material is a compound of alpha nickel.

8. The electrode material of claim 4, wherein the electrode-active material is a compound of alpha nickel and cobalt, with said cobalt compound being present in the range of from greater than about 3 mole percent to about 5 mole percent and a thallium compound present in a concentration of from about $10^{-5}$ to about $10^{-3}$ weight percent of the electrode material.

9. The electrode material of claim 4, wherein said electrode-active material is lead oxide having antimony oxide present in a concentration of from about $10^{-5}$ to about $10^{-3}$ weight percent of the electrode material.

10. The electrode material of claim 4, wherein said electrode-active material is lead oxide having bismuth oxide present in a concentration of from about $10^{-5}$ to about $10^{-3}$ weight percent of the electrode material.

11. A method of preparing a battery electrode comprising providing an electrode-active material selected from chalogen-containing compounds of Ni, Fe, Pb, Co, Cu and mixtures thereof for a positive electrode and selected from the group consisting of Li, Na, K, Ca, Mg, Mn, Zn, Cd, Cu, Si, Al, Pb and alloys thereof for the negative electrode, mixing a ligand in the form of an electrically conductive polymer with the electrode-active material wherein the polymer is present in the range of from about 2% by weight to about 5% by weight of said electrode-active material, to provide metal ion or negative ion vacancies in the range of from about 0.05 to about 0.1 atom percent, said ligands for a positive electrode being selected from the class consisting of polyacetylene polymers having molecular weights in excess of 10,000 and cyclic polyamide with 3–5 functional groups and wherein said ligands for a negative electrode being selected from the class consisting of tertiary butyl cyclohexyl-15-crown-5, TTF-TCNQ, and polymers of polyethylene oxide and one or more of $LiCF_3SO_3$, LiBr, $Na_2S$, and NaCN, mixing a binder with the electrode-active material and polymer, and forming the mixed electrode-active material and polymer and binder into a battery electrode.

* * * * *